United States Patent [19]

Sekiguchi et al.

[11] Patent Number: 4,703,492

[45] Date of Patent: Oct. 27, 1987

[54] JOINED CARBON ELECTRODES AND METHOD FOR THE JOINING THEREOF

[75] Inventors: Yoshishige Sekiguchi; Tomiyasu Kubota, both of Nagano, Japan

[73] Assignee: Showa Denko Kabushiki Kaisha, Tokyo, Japan

[21] Appl. No.: 637,254

[22] Filed: Aug. 3, 1984

[30] Foreign Application Priority Data

Aug. 24, 1983 [JP] Japan .................. 58-129775[U]

[51] Int. Cl.⁴ .............................................. H05B 7/14
[52] U.S. Cl. .................................................. 373/91
[58] Field of Search ....................... 373/91, 92; 285/93, 285/94

[56] References Cited

U.S. PATENT DOCUMENTS 3,468,563 9/1969 Duret ...................................... 285/94
4,349,910 9/1982 Belz ......................................... 373/91
4,375,340 3/1983 Faircloth, Jr. ..................... 373/91 X Primary Examiner—Roy N. Envall, Jr.
Attorney, Agent, or Firm—Sughrue, Mion, Zinn, Macpeak and Seas

[57] ABSTRACT

The present invention relates to joined carbon electrodes, each of which has a mark formed on such a part of the circumferential surface of each of the first and second carbon electrodes that upon the coinciding of the marks with one another the ends of the screws essentially coincide with one another.

8 Claims, 11 Drawing Figures

JOINED CARBON ELECTRODES AND METHOD FOR THE JOINING THEREOF

BACKGROUND OF THE INVENTION

1. Field of the Invention

The present invention relates to joined carbon electrodes and to a method for joining carbon electrodes used for an electric arc furnace, such as a steelmaking furnace.

2. Description of the Prior Art

As is well known, carbon electrodes, hereinafter simply referred to as electrodes, are used for an electric arc furnace, such as a steelmaking furnace.

A prior art is explained with reference to FIG. 1. The first electrode 1 is disposed above the electric arc furnace and is used for smelting. When the first electrode 1 is consumed and thus shortened, the first and second electrodes 1 and 2 are joined as described hereinafter. The first and second electrodes 1 and 2 have circumferential surfaces 1a and 2a, respectively, and are brought into contact with one another at their respective end surfaces 1b and 2b in the joining step. In the joining step, a nipple 3 is screwed into the socket 4 of the second electrode 2. The second electrode 2 is then suspended by a crane (not shown), is disposed above the first electrode 1, and is turned, thereby screwing the socket 4 of the first electrode 1 onto the nipple 3. As a result, the first and second electrodes 1 and 2 are secured to one another via the nipple 3. The screwing is continued until the first and second electrodes 1 and 2 are brought into contact with one another via the end surfaces 1b and 2b. Screwing is conventionally determined as being completed when it becomes impossible to turn the second electrode 2 with a predetermined torque. Thus, the conventional method for determining the completion of screwing is a rather sensory one. Conventionally, the nipple 3 is screwed into the second electrode 2 at a steelmaking plant. Recently, electrodes equipped with a screwed nipple 3 which is not offset toward one of the sockets 4 have been supplied to steelmaking plants. In these electrodes, the nipple 3 is preliminarily screwed into the socket 4 at such a precise position that the largest diameter part of the nipple 3 is not offset toward one of the sockets 4 of the two electrodes 1 and 2.

Regardless of whether or not the nipple 3 is preliminarily screwed into the socket 4, the operation for screwing the nipple 3 into the socket 4 of the first electrode 1 is not easy since the screwing is carried out during the suspension of the second electrode 2 from a crane (not shown). That is, during the screwing of the nipple 3 into the socket 4 of the first electrode 1, the second electrode 2 suspended from the crane must be precisely positioned above the first electrode 1, which is usually installed at an electric smelting furnace, and, furthermore, a crane is not very well adapted for minute adjustment of the position of the second electrode. During the screwing of the nipple 3 and the minute adjustment of the position of the second electrode, a high load is frequently applied to the sockets 4 and the nipple 3. Particularly, the threads of the nipple 3, especially the top threads, and the sockets 4 are exposed to the high load and may be broken. If the threads are broken, fragments thereof remain on the bottom threads and impede normal joining of the nipple 3 and the socket 4, and, thus, determination of the completion of screwing according to the conventional method is inaccurate since the nipple 3 and the socket 4 are not completely joined to one another. If the degree of incomplete joining is great, a clearance can be detected at the electrode-joining end 5. Usually, such incomplete joining is not so great as to be discernible with the naked eye and hence is not detected. If smelting is carried out using joined electrodes which are incompletely joined, accidents such as breakage of the nipple 3 and the socket 4 and the dropping off of the first electrode 1 can occur.

It is known from Japanese Examined Utility Model Publication No. 44-21745 that in order to join the nipple fitted to one of the electrodes to the socket of the other electrode by turning the one electrode, the starting point for turning the one electrode is specified by a mark on the nipple and a mark on the other electrode. The marks are positioned so that at the beginning of screwing of the nipple into the socket the marks coincide with one another and the screw threads stably engage with the screw bottoms. The one electrode mentioned above is first turned to make its nipple mark coincide with the mark formed on the other electrode and the screwing of the nipple into the socket is then started. The joining method disclosed in Japanese Examined Utility Model Publication No. 44-21745 allows only easy starting of the screwing of the nipple into the socket.

SUMMARY OF THE INVENTION

It is an object of the present invention to provide joined electrodes in which breakage of the nipple or a socket(s) and the dropping off of the lower electrode are prevented.

Another object of the present invention is to provide a method for joining electrodes without breakage of the nipple or socket and the dropping off of the lower electrode.

In accordance with the present invention, there are provided joined electrodes for an electric arc furnace comprising:
  joined first and second electrodes having a circumferential surface and being in contact with each other via their respective end surfaces;
  a socket formed on the end-surface side of each of the first and second electrodes;
  a nipple for securing the first and second electrodes, the nipple being disposed in the sockets of the first and second electrodes;
  screws for engaging with the nipple, one screw being formed on the socket of each of the first and second electrodes, an end of the screw coinciding with the end surface of each of the first and second electrodes;
  a mark formed on such a part of the circumferential surface of each of the first and second electrodes that upon the coinciding of the marks with one another the ends of the screws essentially coincide with one another.

In accordance with the present invention, there is also provided a method for joining electrodes comprising the steps of:
  preparing first and second electrodes, each of the electrodes having a circumferential surface and an end surface and including a socket formed at the end-surface side of the electrode and having a screw;
  preparing a nipple;
  fitting the nipple into the socket of the first electrode;

disposing the second electrode above the first electrode and centering the first and second electrodes in relation to one another;

and turning the second electrode around the socket of the first electrode, thereby securing the first and second electrodes to one another via the nipple and screw;

and further comprising the steps of:

forming a mark on such a portion of the circumferential surface of each of the first and second electrodes that upon the coinciding of the marks with one another the ends of the screws essentially coincide with one another; and continuing the turning until the marks coincide.

The present invention is hereinafter described with reference to FIGS. 2 through 6.

DESCRIPTION OF THE PREFERRED EMBODIMENTS

Figure 2:
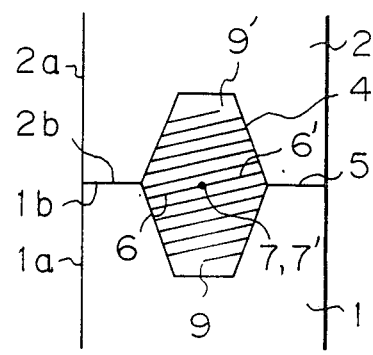
FIG. 2 is a cross-sectional view of joined electrodes illustrating the joining principle according to the present invention.

Referring to FIG. 2, the first and second electrodes 1 and 2 according to the present invention are shown. The nipple is not shown in FIG. 2 to make the wall surface provided with screw threads visible. The screw threads of the first and second electrodes 1 and 2 are denoted by 6 and 6', respectively. The screw threads 6 and 6' spirally extend from the bottom ends 9 and 9', respectively, to the top ends 7 and 7', respectively. The top ends 7 and 7' coincide with one another at the end surfaces 1b and 2b of the first and second electrodes 1 and 2, respectively.

A mark (not shown) is formed on such a part of each of the circumferential surfaces 1a and 2a of the first and second electrodes 1 and 2 that upon the coinciding of the marks with one another the top ends 7 and 7' of the screw threads 6 and 6' coincide with one another.

According to a preferred embodiment, a single continuous screw thread is formed by the screw threads 6 and 6' of the first and second electrodes 1 and 2.

Figure 3:
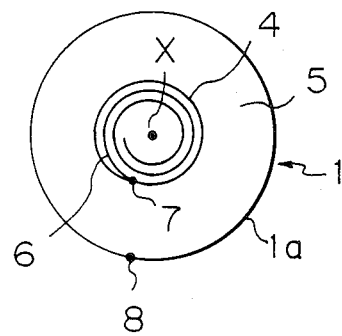
FIG. 3 is a plan view of the first electrode shown in FIG. 2.

According to a preferred embodiment shown in FIG. 3, the mark 8 is positioned in a radial direction from the longitudinal axis (X) of the cylindrical first electrode 1 across the top end 7. The second electrode (not shown) also has a mark positioned in such a radial direction. Any position of the marks other than that shown in FIG. 3 is possible provided that upon the coinciding of the marks the top ends of the screws coincide with one another.

Figure 4A:
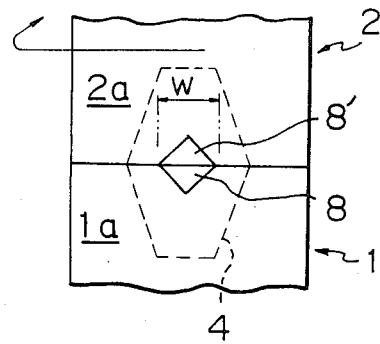
FIGS. 4A and 4B illustrate the joined electrodes according to the examples of the present invention.
Figure 4B:
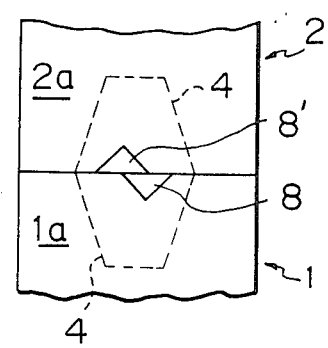

Referring to FIG. 4, an example of the shape and dimension of the marks is shown. The marks 8, 8' preferably have a width (w) of from 1/10 to 1/20 of the circumferential length of each electrode. If the width (w) of the marks 8 and 8' is extremely small or extremely large, it is difficult to judge whether or not the coinciding of the marks 8 and 8' is appropriate. The marks 8 and 8' may be formed, for example, with paint. The coinciding of the marks 8 and 8' according to the present invention may be a complete coinciding, shown in FIG. 4A, or a slightly incomplete coinciding, shown in FIG. 4B.

Figure 5:
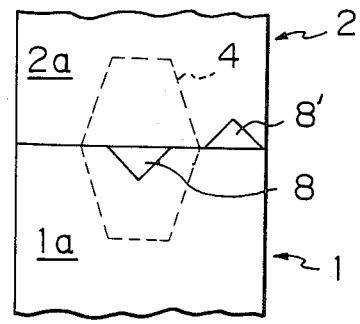
FIG. 5 illustrates a joining method of a comparative example.

The complete non-coinciding of the marks 8 and 8' shown in FIG. 5 indicates that the second electrode 2 is not satisfactorily fastened.

According to a preferred embodiment of the present invention, the second electrode 2 is turned with a predetermined torque in the direction of the arrow in FIG. 4A.

If coinciding of the marks 8 and 8' is not attained during the turning of the second electrode 2 with a predetermined torque, the screw threads 6, 6' can be broken. In the case of non-coinciding of the marks 8 and 8', the second electrode 2 is turned in a reverse direction to make the end surfaces 1a and 2a sufficiently distant from one another so as to enable access to the screw threads 6 and 6', the screw threads 6 and 6' are cleaned, and then the second electrode 2 is turned until the marks 8 and 8' coincide with one another. It is advisable to remove any fragments of the screw threads 6, 6' and then again turn the second electrode 2.

The pitch of the screw threads 6, 6' is usually determined by the industrial standard for carbon electrodes. Coinciding of the marks 8, 8' can occur even if the amount of turning of the second electrode 2 is one turn less than that required for making contact between the end surfaces 1b and 2b. In this case, a clearance of a few millimeters between the end surfaces 1b and 2b can be detected with the naked eye. When such clearance is detected, the second electrode 2 is further turned until the marks 8, 8' coincide with one another, thereby correctly completing the turning. As was explained with reference to FIGS. 4A, 4B, and 5, the coinciding may be a complete coinciding (FIG. 4A) or a slightly incomplete coinciding (FIG. 4B), but a complete non-coinciding (FIG. 5) is unacceptable. In this regard, a tolerable coinciding may be the one shown in FIG. 4A, in which the second electrode 2 is turned slightly beyond the turning limit where the screw threads 6, 6' (FIG. 2) coincide with one another at the top ends 7, 7'. Alternatively, a tolerable coinciding may be the one shown in FIG. 4B, in which the turning of the second electrode 2 is stopped just short of the turning limit described above.

Figure 6:
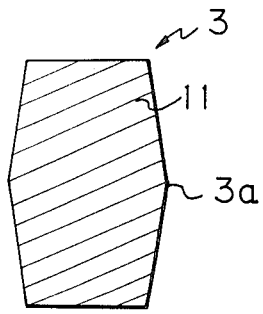
FIGS. 6 and 7 are front elevational views of a nipple.
Figure 7:
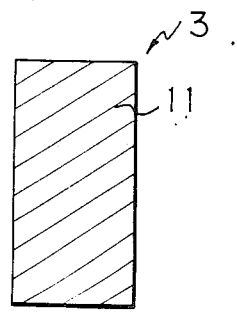

Referring to FIGS. 6 and 7, examples of the nipple are shown. A tapered nipple 3 (FIG. 6) or a straight nipple 3 (FIG. 7) can be used in the present invention. Reference numeral 11 denotes the screw threads of the nipple.

Figure 8:
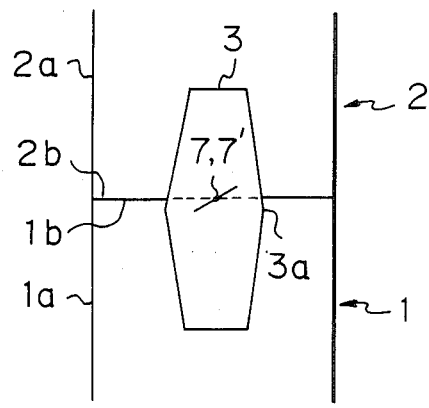
FIG. 8 schematically illustrates joined electrodes according to an example of the present invention.

When the tapered nipple 3 (FIG. 6) is fitted into the socket of an electrode in a steelmaking plant, it is sometimes difficult to locate the largest diameter part 3a at the end surface (not shown) of an electrode. In this case, the nipple 3 is offset toward the socket of the first electrode 1 as shown in FIG. 8 or is offset toward the socket (not shown) of the second electrode 2. Even in this case, the joining according to the present invention makes possible the coinciding of the top ends 7, 7'.

Figure 9:
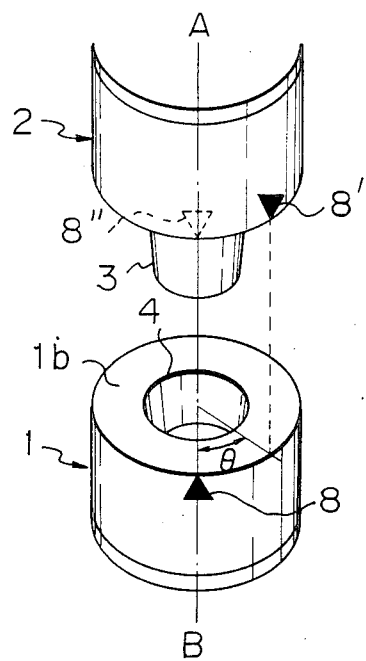
FIG. 9 is an elevational view of two electrodes and illustrates the joining-start method according to an embodiment of the present invention.

According to a preferred embodiment of the method according to the present invention, the turning of the second electrode 2 (FIG. 2) is begun as follows. The second electrode 2 is lowered to insert the nipple 3 into the socket 4 of the first electrode 1 until the downward movement of the second electrode 2 is stopped due to the engagement of the screws (not shown in FIG. 9. The second electrode 2 is turned to adjust the angle ($\theta$) between the marks 8 and 8' in the range of from 30° to 60°. When this angle is attained, the turning of the second electrode 2 is begun. In the actual operation, the second electrode 2 is turned to attain a predetermined angle in the above range and is then lowered, and, before the screw threads engage with one another, the second electrode 2 is turned to precisely attain the predetermined angle. Upon attaining this angle, the turning of the second electrode 2 to screw its nipple 3 into the socket 4 of the first electrode 1 is initiated. The method of utilizing marks for the initiation of turning is disclosed in Japanese Examined Utility Model Publication No. 44-21745. The above-described embodiment according to the present invention is characterized over this method in that the marks are used for determining both the turning-start step and the completion of turning. The present inventors analyzed the movements of the screw threads and the turning of the second electrode 2 as follows.

Figure 10:
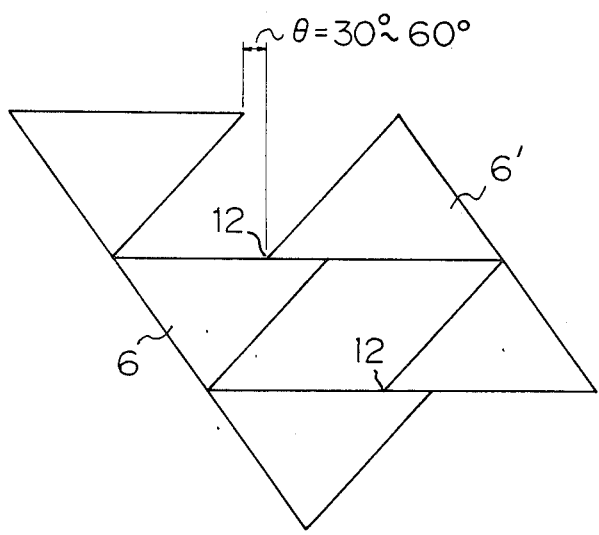
FIG. 10, is a partial enlarged cross-sectional view of screw threads engaged with one another at the joining-start step according to an embodiment of the present invention.

If the positions of the marks coincide with one another as shown by 8" and 8 (FIG. 9), the tip ends 12 of the screw threads 6, 6' (FIG. 10) are exposed to the load of the electrodes and may be broken during the lowering of the second electrode 2. Therefore, it is advisable to shift the mark 8' of the second electrode 2 in a reverse direction, i.e., opposite to the turning direction. If the angle $\theta$ is 30°, the screw threads 6, 6' are placed upon one another as shown in FIG. 10. A preferred angle ($\theta$) for preventing breakage of the electrodes 1, 2 is from 30° to 60°.

If the angle $\theta$ is larger than 60°, the tip ends 12 of the screw threads 6, 6' may be broken. Theoretically, an angle $\theta$ greater than 0° is satisfactory for joining. Actually, the angle $\theta$ can be varied during the lowering of the second electrode 2, and, therefore, for the sake of safety, an angle $\theta$ of more than 30° is preferable so as to prevent the tip ends 12 of the screw thread(s) 6', 6 from contacting each other.

Figure 1:
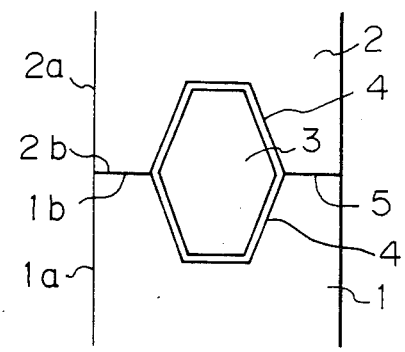
FIG. 1 is a schematic cross-sectional view of conventional joined electrodes.

According to the present invention, accidents such as breakage of the electrodes at the joining part and the dropping off of the lower electrode which can occur during electrode joining with a crane and during the operation of an arc furnace can be reduced by 20%-30% as compared with the prior art illustrated with reference to FIG. 1.

We claim:

1. Joined carbon electrodes for an electric arc furnace comprising:
   first and second carbon electrodes each having a circumferential surface and an end surface disposed in contact with each other at their respective end surfaces;
   first and second sockets formed in the end surface of each of said first and second carbon electrodes and having first and second screw threads having top ends disposed adjacent said end surfaces respectively; and
   a nipple for securing said first and second carbon electrodes together wherein said nipple is provided with screw thread means on an outer surface thereof and is disposed in threaded engagement with the socket of said first and second carbon electrodes with the top end of said first screw thread coinciding with the top end of said second screw thread to form a single continuous screw thread in said first and second sockets and wherein first and second marks are located on the circumferential surface of said first and second carbon electrodes, respectively, at the same circumferential positions relative to the top ends of said first and second screw threads, respectively, whereby said first and second marks will coincide with one another when the top ends of the first and screw threads coincide with one another.

2. Joined carbon electrodes according to claim 1, wherein said nipple is a tapered nipple.

3. Joined carbon electrodes according to claim 1, wherein said nipple is a straight nipple.

4. Joined carbon electrodes according to claim 1, herein said first and second carbon electrodes are cylindrical.

5. A method for joining carbon electrodes for an electric arc furnace comprising the steps of:
   preparing first and second carbon electrodes, each of said electrodes having a circumferential surface and an end surface and including a socket disposed in said end surface of the electrodes and having a screw thread therein with a top end disposed adjacent said end surface;
   preparing a nipple having screw thread means on the outer surface thereon;
   threading said nipple into the socket of said a first electrodes;
   disposing said second electrode above said first electrode and centering said first and second electrodes in relation to another;
   turning said second electrode around the socket of said first electrode thereby securing said first and second electrodes to one another via said nipple and screw;
   placing a mark on the circumferential surface of each of said first and second electrodes at the same circumferential position relative to the top end of socket screw thread therein whereby upon coinciding of the marks with one another the top ends of the screw threads of the sockets essentially coincide with one another to define a single continuous screw thread in the sockets of said first and second electrodes; and
   continuing said turning until said marks coincide.

6. A method according to claim 5, wherein said second carbon electrode is suspended from a crane and said disposing, centering, and turning are performed during the suspension of said second electrode from said crane.

7. A method according to claim 5, wherein said turning is started with a predetermined torque in one direction and when coinciding of said marks is not attained with said predetermined torque, said second carbon electrode is turned in a reverse direction until a clearance between said end surfaces becomes sufficient to enable access to said threads, the threads are cleaned, and, subsequently, said second electrode is again turned in said direction.

8. A method according to claim 6, wherein the angle between said marks when said threads initially engage with one another is from 30° to 60°.

* * * * *